A. S. SHONTZ.
Combined Stovepipe Damper and Collar.

No. 123,298.

Patented Jan. 30, 1872.

123,298

UNITED STATES PATENT OFFICE.

ABSALOM S. SHONTZ, OF QUINCY, ILLINOIS.

IMPROVEMENT IN COMBINED DAMPERS AND STOVE-PIPE COLLARS.

Specification forming part of Letters Patent No. 123,298, dated January 30, 1872.

*To whom it may concern:*

Be it known that I, ABSALOM S. SHONTZ, of Quincy, in the county of Adams and State of Illinois, have invented a new and useful Improvement in a Stove-Pipe Damper and Collar Combined; and I do declare that the following is a true and accurate description thereof, reference being had to the accompanying drawing and to the letters of reference marked thereon, and being a part of this specification, in which—

Figure 1:
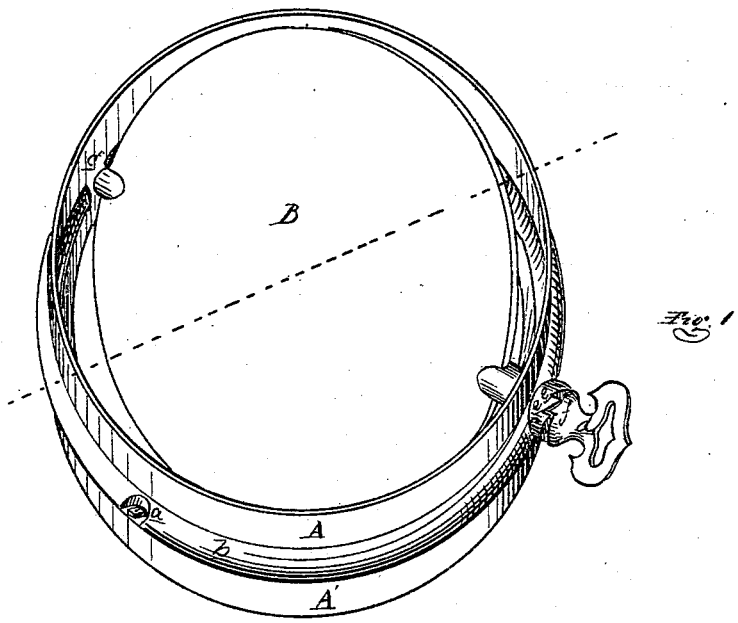
Figure 2:
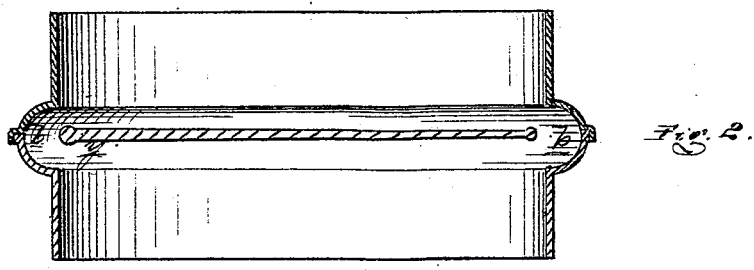
Figure 3:
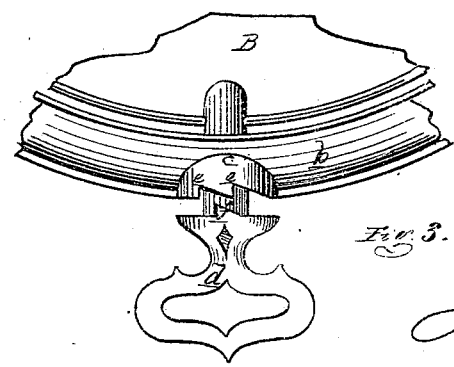

Figure 1 is a perspective view of my device. Fig. 2 is a cross-section on the line $x$ $x$ in Fig. 1; and Fig. 3 is a detail in plan of the handle and locking devices.

Similar letters of reference indicate corresponding parts in the several figures.

The nature of this invention relates to a combined stove-pipe damper and collar, and to the arrangement of the parts for locking the damper in the closed and half-open positions. The invention consists in the novel and peculiar construction of the collar, and the combination therewith of a damper weighted at one side, so that when freed from the locking notches it will always remain open, and in the peculiar devices for locking the damper in the closed and half-opened positions, as more fully hereinafter set forth.

In the drawing, A A' represent a pair of iron collars joined together by bolts $a$. The joining edges are flanged outwardly to form a semicircular groove, $b$, at the point of juncture. The collars are formed with bearings $c$ $c'$ opposite each other, to receive the journals of a circular plate or damper, B, which rotates freely therein, one of its axes being elongated to form a handle, $d$. One side of the damper is cast or formed heavier than the other, so that when free it will thereby be caused to remain open, the heavier part being shown at $y$ in Fig. 2. The damper is a little less in diameter than the cylindrical portions of the collars, and its axes are so arranged as to permit of a slight longitudinal movement in their bearings. The outer face of the superior half of the bearing $c$ is formed with a vertical ratchet-notch or stop, $e$, and another, $e'$, at an angle of forty-five degrees in the direction of the heavy side of the damper. The adjacent face of the handle-collar has formed on it a clutch, $f$, which, when engaged with the vertical notch $e$, will lock the damper in a horizontal plane or closed position, and with the other notch at an angle of forty-five degrees, or half open. By drawing out the handle and letting it go the weight of the heavy side of the damper will cause it to assume the vertical or open position. It will be seen that to lock it in the other positions, all that is necessary is to turn the handle to the desired point and push the clutch into the recess or notch $e$ or $e'$, as the case may be. More notches may be employed if other adjustments are required, but generally two will be found sufficient.

In the closed position of the damper the annular recess $b$ affords an exit for the smoke and gases of combustion, which, in their upward passage, are deflected to the walls of the pipe, to which they impart their heat.

The damper and collars may be made of either cast or sheet metal.

By elevating the outer end of the damper-shaft, or by causing its inner collar to abut against an inclined plane, the clutch will automatically engage with the notches.

What I claim as my invention, and desire to secure by Letters Patent, is—

1. The collar-sections A A', bolted together, as shown, provided with the encircling groove $b$ for the passage of the smoke and gases of combustion, and the bearings $c$ $c'$ for the journals of a damper, substantially as described.

2. The combination, with the collar-sections A A', provided with the internal grooves $b$, of the damper-plate B, as shown and set forth.

3. The combination of the clutch $f$ on the damper-handle collar $d$, the ratchet-notches $e$ and $e'$ on the collar-sections, and the damper-plate B, weighted on one side, when all are constructed, arranged, and operated as described and shown, for the purpose set forth.

ABSALOM S. SHONTZ.

Witnesses:
THOMAS WHITE,
D. McAFEE.